United States Patent
Moore

(10) Patent No.: US 9,495,960 B1
(45) Date of Patent: Nov. 15, 2016

(54) IVR ENGAGEMENTS AND UPFRONT BACKGROUND NOISE

(71) Applicant: West Corporation, Omaha, NE (US)

(72) Inventor: Shelley L. Moore, Omaha, NE (US)

(73) Assignee: West Corporation, Omaha, NE (US)

(*) Notice: Subject to any disclaimer, the term of this patent is extended or adjusted under 35 U.S.C. 154(b) by 0 days.

(21) Appl. No.: 14/226,489

(22) Filed: Mar. 26, 2014

(51) Int. Cl.
*H04M 1/64* (2006.01)
*G10L 15/20* (2006.01)
*G10L 21/0216* (2013.01)
*H04M 3/493* (2006.01)

(52) U.S. Cl.
CPC ............ *G10L 15/20* (2013.01); *G10L 21/0216* (2013.01); *H04M 3/493* (2013.01)

(58) Field of Classification Search
CPC ........... H04M 17/205; H04M 17/208; H04M 1/271; H04M 2201/40
USPC .............................................. 379/88.01, 88.12
See application file for complete search history.

(56) References Cited

U.S. PATENT DOCUMENTS

| | | | |
|---|---|---|---|
| 6,453,041 B1* | 9/2002 | Eryilmaz | H04B 1/46 379/392.01 |
| 2003/0027602 A1* | 2/2003 | Han | H04M 1/274583 455/566 |
| 2008/0152094 A1* | 6/2008 | Perlmutter | G10L 15/30 379/88.01 |

* cited by examiner

*Primary Examiner* — Van D Huynh
(74) *Attorney, Agent, or Firm* — Raffi Gostanian

(57) ABSTRACT

Speech recognition error may be reduced or eliminated when background noise is detected at a customer's location. For example, when background noise is detected at the customer's location, the customer may be prompted to use dual-tone multi-frequency (DTMF).

15 Claims, 4 Drawing Sheets

US 9,495,960 B1

IVR ENGAGEMENTS AND UPFRONT BACKGROUND NOISE

FIELD

The present invention relates to noise detection systems and, more particularly, to systems that detect background noise during a call.

BACKGROUND

Speech analysts frequently encounter upfront background noise that causes utterances to be grammatically incorrect. For example, if a customer receives calls an interactive voice response (IVR) application, background noise at the customer's location may cause a delay in processing of the call by the IVR application. Thus, an application that reduces or eliminates speech recognition errors due to background noise may be beneficial.

SUMMARY

Certain embodiments of the present invention may provide solutions to the problems and needs in the art that have not yet been fully identified, appreciated, or solved by current IVR applications. For example, embodiments of the present invention pertain to reducing or eliminating speech recognition errors when background noise at the user's location is above a predetermined threshold.

In one embodiment, an apparatus is provided. The apparatus includes memory including a set of instructions and at least one processor. The set of instructions, when executed by the at least one processor, is configured to cause the apparatus to detect background noise at a location of a customer and prompt the customer to use dual-tone multi-frequency (DTMF) when the background noise at the location of the customer is excessive.

In another embodiment, a computer-implemented method is provided. The computer-implemented method includes detecting background noise at a location of a customer and prompting the customer to use DTMF when the background noise at the location of the customer is excessive.

In yet another embodiment, a computer program is provided. The computer program is embodied on a non-transitory computer-readable medium. The computer program is configured to cause at least one processor to detect background noise at a location of a customer and prompt the customer to use DTMF when the background noise at the location of the customer is excessive.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to reducing or eliminating speech recognition errors when background noise at the customer's (or callee) location is detected. For example, when background noise at a location of the customer is detected, the customer may be prompted to use dual-tone multi-frequency (DTMF).

Figure 1:
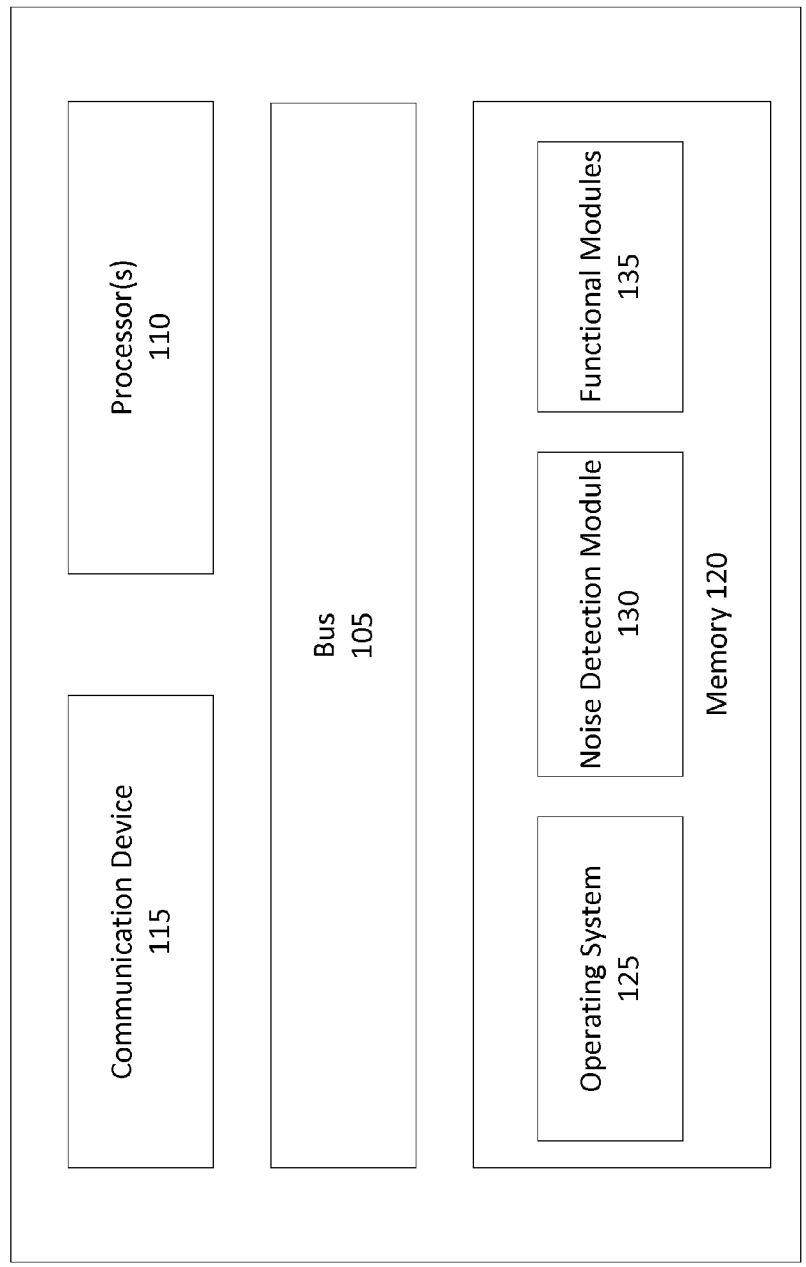
FIG. 1 is a block diagram illustrating a computing system, according to an embodiment of the present invention.

FIG. 1 illustrates a block diagram of a computing system 100, according to one embodiment of the present invention. Computing system 100 includes a bus 105 or other communication mechanism configured to communicate information, and at least one processor 110, coupled to bus 105, that is configured to process information. At least one processor 110 can be any type of general or specific purpose processor. Computing system 100 also includes memory 120 configured to store information and instructions to be executed by at least one processor 110. Memory 120 can be comprised of any combination of random access memory ("RAM"), read only memory ("ROM"), static storage such as a magnetic or optical disk, or any other type of computer readable medium. Computing system 100 also includes a communication device 115, such as a network interface card, configured to provide access to a network.

The computer readable medium may be any available media that can be accessed by at least one processor 110. The computer readable medium may include both volatile and nonvolatile medium, removable and non-removable media, and communication media. The communication media may include computer readable instructions, data structures, program modules, or other data and may include any information delivery media.

According to this embodiment, memory 120 stores software modules that provide functionality when executed by at least one processor 110. The modules include an operating system 125 and a noise detection module 130, as well as other functional modules 135. Operating system 125 may provide operating system functionality for computing system 100. Noise detection module 130 may detect background noise at any time during the call. Because computing system 100 may be part of a larger system, computing system 100 may include one or more additional functional modules 135 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
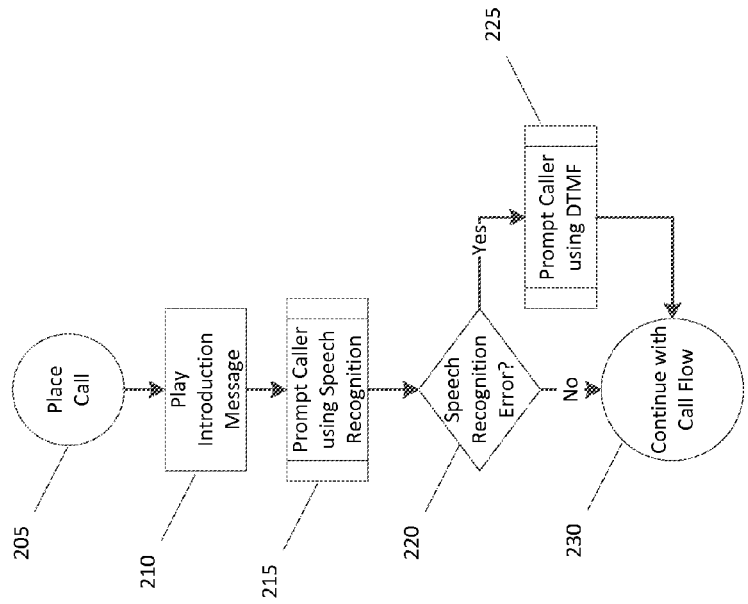
FIG. 2 is flow diagram illustrating a conventional process for detecting an error in speech recognition.

FIG. 2 is flow diagram 200 illustrating a conventional process for detecting an error in speech recognition. The conventional process begins at 205 with an IVR system placing a call to a customer. The call can be placed for any reason. For example, when a customer dials into the IVR system, agents may be busy and the customer may request that the IVR system place a call to the customer when an agent is available. In another example, the IVR system may call a customer when the customer is inadvertently disconnected from the IVR system.

At 210, the IVR system plays an introduction message to the customer, and, at 215, prompts the customer using speech recognition. At 220, if the IVR system detects an error during speech recognition, the IVR system prompts the customer to use DTMF at 225. If the IVR system does not detect an error during speech recognition at 220, then the IVR system continues with the voice recognition process at 230 to connect the customer to an appropriate agent.

The process illustrated in FIG. 2 may encounter a number of problems. For example, depending on the configuration of the IVR, numerous amounts of retries may be provided to the customer when the system cannot recognize the utterance due to background noise at the customer's location. To overcome such problems, the process shown in FIG. 3 may be utilized.

Figure 3:
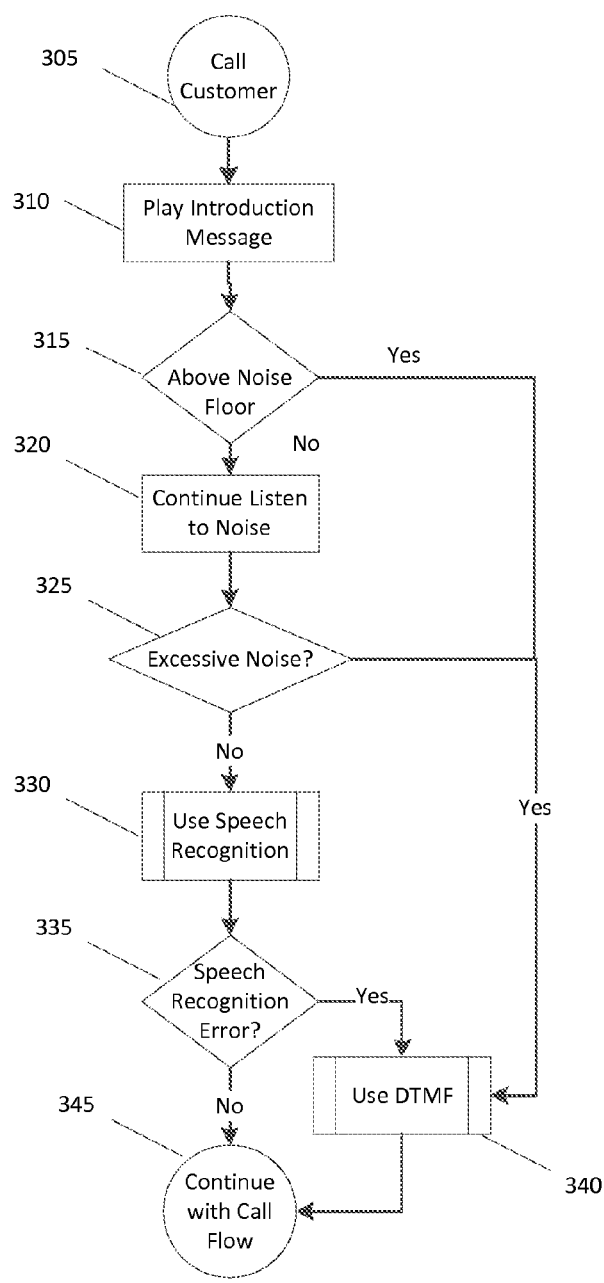
FIG. 3 is a flow diagram illustrating a process for detecting background noise during a call, according to an embodiment of the present invention.

FIG. 3 is a flow diagram 300 illustrating a process for detecting background noise during a call, according to an embodiment of the present invention. The process of FIG. 3 may be executed by, for example, by computing system 100 of FIG. 1. In this embodiment, the computing system at 305 calls a customer and, at 310, plays an introduction message when the customer answers the call. In certain embodiments, the welcome message is played to the customer immediately after, or after a brief delay, the customer answers a call from the IVR system.

At 315, the computing system determines whether the background noise at the customer's location is above a noise floor (or background noise level). A speech recognizer may be utilized to determine noise, and set associate 'acceptable levels" of noise. In certain embodiments, the noise floor may be determined while the introduction message is played. In other embodiments, the noise floor may be determined after completion of the welcome message. If the noise level is above the noise floor, the computing system at 340 prompts the customer to use DTMF to complete the call flow to connect to an agent, for example. When the noise level is at or below the noise floor, the process continues with the IVR application.

Because background noise may fluctuate (i.e., increase or decrease) at the location of the customer from one sampling period to the next, the computing system at 320 continues to listen to the background noise at the location of the customer, and, at 325, determines whether the background noise is excessive. For example, the computing system may detect whether the location of the customer contains a sufficient degree of background noise such that successful speech recognition is impossible. This may be measured, for example, by a signal strength of the background noise, a number of decibels of the background noise, or any other noise analysis technique that would be understood by one of ordinary skill in the art. It should also be appreciated that the level of background noise may be determine during each prompt, or after the IVR application has prompted the user to provide a response.

If the computing system detects excessive background noise, then at 340 the customer is prompted to use DTMF to complete the call flow to connect to an agent, for example. If the computing system does not detect excessive background noise at 325, then at 330, the customer is prompted using speech recognition.

At 335, the computing system detects whether a speech recognition error has occurred. If a speech recognition error has occurred, then at 340, the customer is prompted to use DTMF to complete the call flow to connect to the agent, for example. Otherwise, the call flow continues at 345 to connect the user to the agent.

It should be appreciated that in certain embodiments, the background noise detection is activated throughout the call to ensure that the customer is connected to the agent promptly. The embodiments discussed herein may reduce customer frustration and shorten the call length. Furthermore, by detecting noisy environments, a greater insight is provided into how well speech recognition works in an ideal environment and how often the customer is not in an ideal calling environment (e.g., outside in traffic, music playing, conversation in background, etc.).

Figure 4:
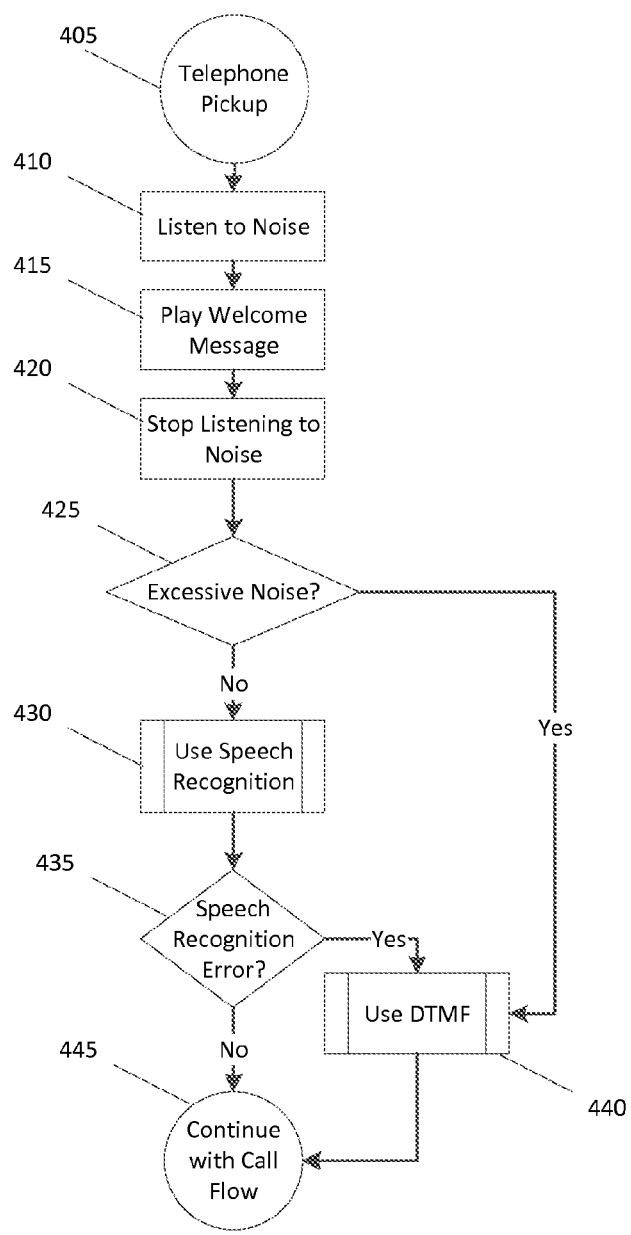
FIG. 4 is a flow diagram illustrating a process for detecting background noise during a call, according to an embodiment of the present invention.

FIG. 4 is a flow diagram 400 illustrating a process for detecting background noise during a call, according to an embodiment of the present invention. The process of FIG. 4 may be executed by, for example, computing system 100 of FIG. 1.

In this embodiment, the computing system at 405 places a call to the customer, who answers the phone, and at 410, the computing system starts to listen to background noise at a location of the customer prior to playing the welcome message.

At 415, the computing system plays a welcome message to the customer. In certain embodiments, the welcome message is played to the customer when the customer picks up the phone. At 420, the computing system stops listening to the background noise at the location of the customer, and, at 425, determines whether the background noise is excessive. For example, the computing system may detect whether the location of the customer contains a sufficient degree of background noise such that successful speech recognition is impossible. This may be measured, for example, by a signal strength of the background noise, a number of decibels of the background noise, or any other noise analysis technique that would be understood by one of ordinary skill in the art.

In other embodiments, the computing system may compare the noise floor with the background noise. For example, if the background noise is greater than the noise floor, then the background noise is considered to be excessive. Otherwise, the background noise is considered to be non-excessive.

If the computing system detects excessive background noise, then at 440, the customer is prompted to use DTMF to complete the call flow to connect to an agent, for example. If the computing system does not detect excessive background noise at 425, then at 430, the customer is prompted using the speech recognition.

At 435, the computing system detects whether speech recognition error has occurred. If speech recognition error has occurred, then at 440, the customer is prompted to use DTMF to complete the call flow to connect, for example, to the agent. Otherwise, the call flow continues at 445 to connect the customer to the agent, for example.

It should be appreciated that in certain embodiments, the background noise detection is activated throughout the call to ensure that the customer is connected to the agent promptly. The embodiments discussed herein may reduce customer frustration and shorten the call length. Furthermore, by detecting noisy environments, a greater insight is provided into how well speech recognition works in an ideal environment and how often customers are not in an ideal environment.

The processes shown in FIGS. 3 and 4 may be performed, in part, by a computer program, encoding instructions for a nonlinear adaptive processor to cause at least the processes described in FIGS. 3 and 4 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 3 and 4, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An apparatus, comprising:
   memory comprising a set of instructions; and
   at least one processor, wherein
   the set of instructions, when executed by the at least one processor, are configured to cause the apparatus to:
   detect a signal strength of the background noise at a location of a customer during a call,
   determine a noise floor after the call is answered by the customer based on the signal strength of the background noise,
   set an acceptable level of background noise to use with an interactive voice response (IVR) application during the call,
   determine the background noise at the location of the customer is above the noise floor after the IVR application has provided a prompt to the customer, and
   prompt the customer to use dual-tone multi-frequency (DTMF) when the background noise is excessive at the location of the customer.

2. The apparatus of claim 1, wherein the set of instructions, when executed by the at least one processor, are further configured to cause the apparatus to listen for the background noise at the location of the customer when a call is answered by the customer.

3. The apparatus of claim 1, wherein the set of instructions, when executed by the at least one processor, are further configured to cause the apparatus to determine whether speech recognition error occurred during the call.

4. The apparatus of claim 1, wherein the set of instructions, when executed by the at least one processor, are further configured to cause the apparatus to instruct the customer to use DTMF when speech recognition error is detected during the call.

5. The apparatus of claim 1, wherein the set of instructions, when executed by the at least one processor, are further configured to cause the apparatus to detect the noise floor at a location of the customer while playing an introduction message to the customer.

6. A computer-implemented method, comprising:
   detecting, by a computing system, a signal strength of background noise at a location of a customer during a call;

determining a noise floor after the call is answered by the customer based on the signal strength of the background noise;

setting an acceptable level of background noise to use with an interactive voice response (IVR) application during the call;

determining the background noise at the location of the customer is above the noise floor after the IVR application has provided a prompt to the customer; and prompting the customer, by the computing system, to use dual-tone multi-frequency (DTMF) when the background noise at the location of the customer is excessive.

7. The computer-implemented method of claim 5, further comprising:

listening, by the computing system, for the background noise at the location of the customer after a call is answered by the customer.

8. The computer-implemented method of claim 5, further comprising:

determining, by the computing system, whether the background noise at the location of the customer is excessive.

9. The computer-implemented method of claim 5, further comprising:

determining, by the computing system, whether speech recognition error occurred during the call.

10. The computer-implemented method of claim 5, further comprising:

detecting, by the computing system, the noise floor at a location of the customer while playing an introduction message to the customer.

11. A computer program embodied on a non-transitory computer-readable medium, the computer program configured to cause at least one processor to:

detect a signal strength of the background noise at a location of a customer during a call, determine a noise floor after the call is answered by the customer based on the signal strength of the background noise, set an acceptable level of background noise to use with an interactive voice response (IVR) application during the call, determine the background noise at the location of the customer is above the noise floor after the IVR application has provided a prompt to the customer, and prompt the customer to use dual-tone multi-frequency (DTMF) when the background noise is excessive at the location of the customer.

12. The computer program of claim 11, wherein the computer program is further configured to cause the at least one processor to listen for background noise at the location of the customer after a call is answered by the customer.

13. The computer program of claim 11, wherein the computer program is further configured to cause the at least one processor to determine whether speech recognition error occurred during the call.

14. The computer program of claim 11, wherein the computer program is further configured to cause the at least one processor to instruct the customer to use DTMF when speech recognition error is detected during the call.

15. The computer program of claim 11, wherein the computer program is further configured to cause the at least one processor to detect the noise floor at the location of the customer while to playing an introduction message to the customer.

* * * * *